United States Patent
Kim et al.

(10) Patent No.: US 9,731,749 B2
(45) Date of Patent: Aug. 15, 2017

(54) POWER STEERING APPARATUS OF VEHICLE

(71) Applicant: Mando Corporation, Pyeongtaek-si, Gyeonggi-do (KR)

(72) Inventors: Heung Ju Kim, Yongin-si (KR); Byung Yun Choi, Seongnam-si (KR)

(73) Assignee: MANDO CORPORATION, Pyeongtaek-si, Gyeonggi-Do (KR)

( * ) Notice: Subject to any disclaimer, the term of this patent is extended or adjusted under 35 U.S.C. 154(b) by 0 days.

(21) Appl. No.: 15/150,430

(22) Filed: May 10, 2016

(65) Prior Publication Data
US 2016/0339942 A1    Nov. 24, 2016

(30) Foreign Application Priority Data
May 19, 2015    (KR) ........................ 10-2015-0069734

(51) Int. Cl.
| | |
|---|---|
| *B62D 3/12* | (2006.01) |
| *B22C 9/24* | (2006.01) |
| *B62D 5/04* | (2006.01) |
| *B62D 6/10* | (2006.01) |
| *B22C 9/10* | (2006.01) |

(52) U.S. Cl.
CPC ............. *B62D 3/12* (2013.01); *B22C 9/10* (2013.01); *B22C 9/101* (2013.01); *B22C 9/24* (2013.01); *B62D 5/0403* (2013.01); *B62D 6/10* (2013.01)

(58) Field of Classification Search
CPC ....... B62D 3/12; B62D 5/0403; B62D 5/0406
See application file for complete search history.

(56) References Cited

U.S. PATENT DOCUMENTS 8,066,092 B2 *  11/2011  Shimizu ................... B62D 1/16
                                                   180/443
8,960,364 B2 *   2/2015  Ji ............................. B62D 6/10
                                                   180/443

FOREIGN PATENT DOCUMENTS

| JP | 2004243988 A | 9/2004 |
|---|---|---|
| JP | 2008149843 A | 7/2008 |
| JP | 2009241786 A | 10/2009 |

OTHER PUBLICATIONS

Korean Office Action dated Apr. 1, 2016 in connection with the counterpart Korean Patent Application No. 10-2015-0069734.

\* cited by examiner

*Primary Examiner* — Kevin Hurley
(74) *Attorney, Agent, or Firm* — Hauptman Ham, LLP

(57) ABSTRACT

The present disclosure relates to a power steering apparatus of a vehicle that includes: a rack housing configured to surround a rack bar and having an opening portion formed at one side thereof through which a steering shaft passes; a torque sensor cover that has a torque sensor therein and has a communicating hole formed therein through which the steering shaft passes and a first penetration portion having a first through-hole formed therein through which the fastening member passes; and a cover connecting member that has an insertion portion and a second penetration portion in order to connect the rack housing and the torque sensor cover, the insertion portion having an insertion hole formed therein where the opening portion is inserted and coupled and the second penetration portion having a second through-hole that is formed therein to correspond to the fastening hole and through which the fastening member passes.

8 Claims, 5 Drawing Sheets

POWER STEERING APPARATUS OF VEHICLE

CROSS REFERENCE TO RELATED APPLICATION

This application claims priority from Korean Patent Application No. 10-2015-0069734, filed on May 19, 2015, which is hereby incorporated by reference for all purposes as if fully set forth herein.

BACKGROUND OF THE INVENTION

1. Field of the Invention

The present invention relates to a power steering apparatus of a vehicle. More specifically, the present invention relates to a power steering apparatus of a vehicle in which a complex rack housing structure is separately manufactured and coupled in order to simplify the shape of the rack housing so that it is possible to prevent a weak portion from being generated in the main core for manufacturing the rack housing, thereby reducing a crack of the main core and it is possible to reduce the number of slide cores used in the manufacturing of the rack housing, thereby facilitating the maintenance of the main core and the slide cores and reducing the manufacturing process and time.

2. Description of the Prior Art

FIG. 1 is a schematic view of a power steering apparatus of a vehicle, and FIG. 2 is an exploded perspective view of a part of the power steering apparatus of the vehicle according to the related art.

As illustrated in FIG. 1, the power steering apparatus 100 of the vehicle, according to the related art, includes: a steering wheel 102 disposed above a driver's seat; a steering shaft 104 connected to the steering wheel 102; a steering column 106 configured to fix the steering shaft 104 to a vehicle body; a rack gear 108 and a pinion gear 110 that convert a rotational force input from the steering shaft 104 into a linear motion; a rack bar 140 having inner ball joints 130 at opposite ends thereof; a rack housing 150 formed to surround the outer circumferential surface of the rack bar 140; tie rods 160 integrally formed with the balls of the inner ball joints 130; and outer ball joints 170 provided on the distal ends of the tie rods 160 and connected to knuckles 190 of tires 180.

As illustrated in FIG. 2, the power steering apparatus 100 of the vehicle, according to the related art, includes: the rack bar 140 that extends in the lateral direction of the vehicle and includes the rack gear 108 on a side of the outer circumferential surface thereof; the steering shaft 104 that includes the pinion gear 110 that is engaged with the rack gear 108; a torque sensor 207 coupled to the steering shaft 104; and the rack housing 150 in which the rack bar 140, the steering shaft 104, the torque sensor 207, and the like are accommodated.

In the power steering apparatus 100 of the vehicle, according to the related art, the steering shaft 104 and the torque sensor 207 are coupled to the rack housing 150, a connector 211 of a wire harness 209 that is inserted into the rack housing 150 through one side thereof is coupled to the torque sensor 207, and the wire harness 209 is inserted into the rack housing 150 through a wire cover 219 that is fixed to the rack housing 150 by fixing bolts 221.

After the steering shaft 104 and the torque sensor 207 are coupled to the rack housing 150, a rack housing cover 215 having a sealing member 213 coupled to the top thereof is coupled to the rack housing 150 by fastening members 217.

However, since the complex shape of the rack housing and a number of slide cores cause the main core for manufacturing the rack housing to weaken and crack, it is costly to manufacture the rack housing, it is difficult to carry out the maintenance of the main core and the slide cores, which are used to manufacture the rack housing, and the rack housing casting equipment becomes large.

Further, in the manufacturing of the rack housing having a complex shape, a number of slide cores cause an increase in the manufacturing process, time, and cost.

SUMMARY OF THE INVENTION

In this background, an aspect of the present invention is to provide a power steering apparatus of a vehicle in which a complex structure is separately manufactured and coupled in the manufacturing of a rack housing, which simplifies the shape of the rack housing, so that it is possible to prevent a weak portion from being generated in the main core for manufacturing the rack housing and to reduce the number of slide cores used in the manufacturing of the rack housing, thereby reducing the manufacturing process and time.

Another aspect of the present invention is to provide a power steering apparatus of a vehicle that can: reduce a crack of the main core for manufacturing the rack housing; facilitate the maintenance of the slide cores due to the change of some shape slides to relatively simple pin slides; and make the rack housing casting equipment compact.

The aspect of the present invention is not limited thereto, and other unmentioned aspects of the present invention may be clearly appreciated by those skilled in the art from the following descriptions.

In accordance with an aspect of the present invention, there is provided a power steering apparatus of a vehicle that includes: a rack housing configured to surround a rack bar and having an opening portion formed at one side thereof through which a steering shaft passes, wherein a fastening portion protrudes from the outer circumferential surface of the opening portion and has a fastening hole formed therein to which a fastening member is screw-coupled; a torque sensor cover that has a torque sensor therein and has a communicating hole formed therein through which the steering shaft passes and a first penetration portion having a first through-hole formed therein through which the fastening member passes, wherein the first penetration portion is provided to correspond to the fastening hole; and a cover connecting member that has an insertion portion and a second penetration portion in order to connect the rack housing and the torque sensor cover, the insertion portion having an insertion hole formed therein where the opening portion is inserted and coupled and the second penetration portion having a second through-hole that is formed therein to correspond to the fastening hole and through which the fastening member passes, wherein the cover connecting member has the outer periphery formed in a shape corresponding to the outer periphery of the torque sensor cover and protrudes toward the torque sensor cover such that the torque sensor cover is coupled thereto.

As described above, according to the present invention, the complex structure is separately manufactured and coupled in the manufacturing of the rack housing, which simplifies the shape of the rack housing, so that it is possible to prevent a weak portion from being generated in the main core for manufacturing the rack housing and to reduce the number of slide cores used in the manufacturing of the rack housing, thereby reducing the manufacturing process and time.

In addition, it is possible to reduce a crack of the main core for manufacturing the rack housing, to facilitate the maintenance of the slide cores due to the change of some shape slides to relatively simple pin slides, and to make the rack housing casting equipment compact.

BRIEF DESCRIPTION OF THE DRAWINGS

The above and other objects, features, and advantages of the present invention will be more apparent from the following detailed description taken in conjunction with the accompanying drawings, in which.

DETAILED DESCRIPTION OF THE EXEMPLARY EMBODIMENTS

Figure 1:
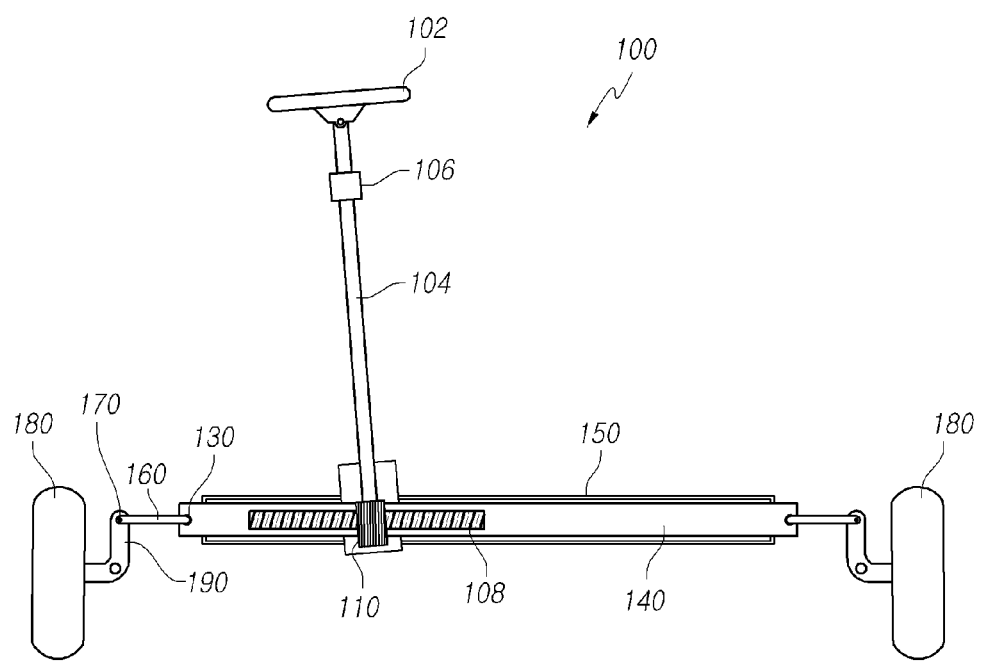
FIG. 1 is a schematic view of a power steering apparatus of a vehicle.
Figure 2:
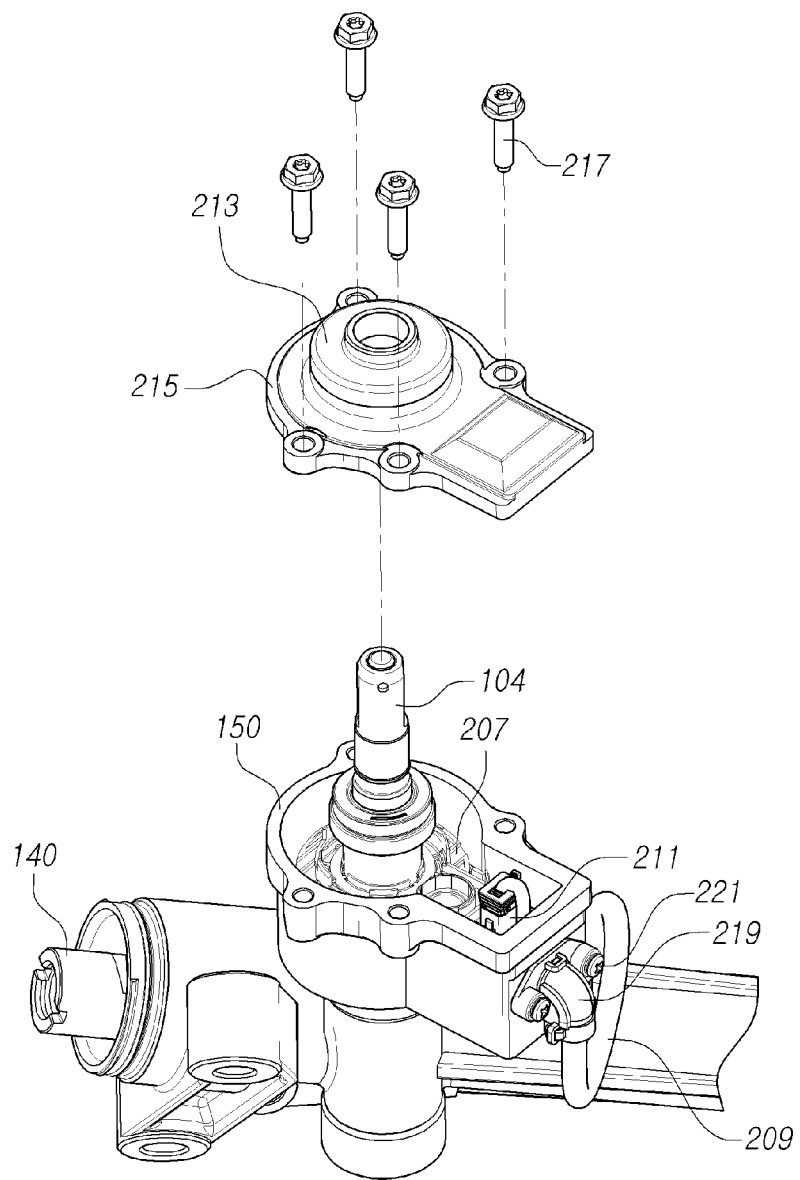
FIG. 2 is an exploded perspective view of a part of the power steering apparatus of the vehicle according to the related art.

Hereinafter, some embodiments of the present invention will be described in detail with reference to the accompanying drawings. In adding reference numerals to elements in each drawing, it should be noted that the same elements are designated by the same reference numerals, if possible, although they are shown in different drawings. Further, in the following description of the present invention, a detailed description of known functions and configurations incorporated herein will be omitted when it may make the subject matter of the present invention rather unclear.

In addition, terms, such as first, second, A, B, (a), (b) or the like may be used herein when describing components of the present invention. These terms are merely used to distinguish one structural element from other structural elements, and a property, an order, a sequence and the like of a corresponding structural element are not limited by the term. It should be noted that if it is described in the specification that one component is "connected," "coupled" or "joined" to another component, a third component may be "connected," "coupled," and "joined" between the first and second components, although the first component may be directly connected, coupled or joined to the second component.

Figure 3:
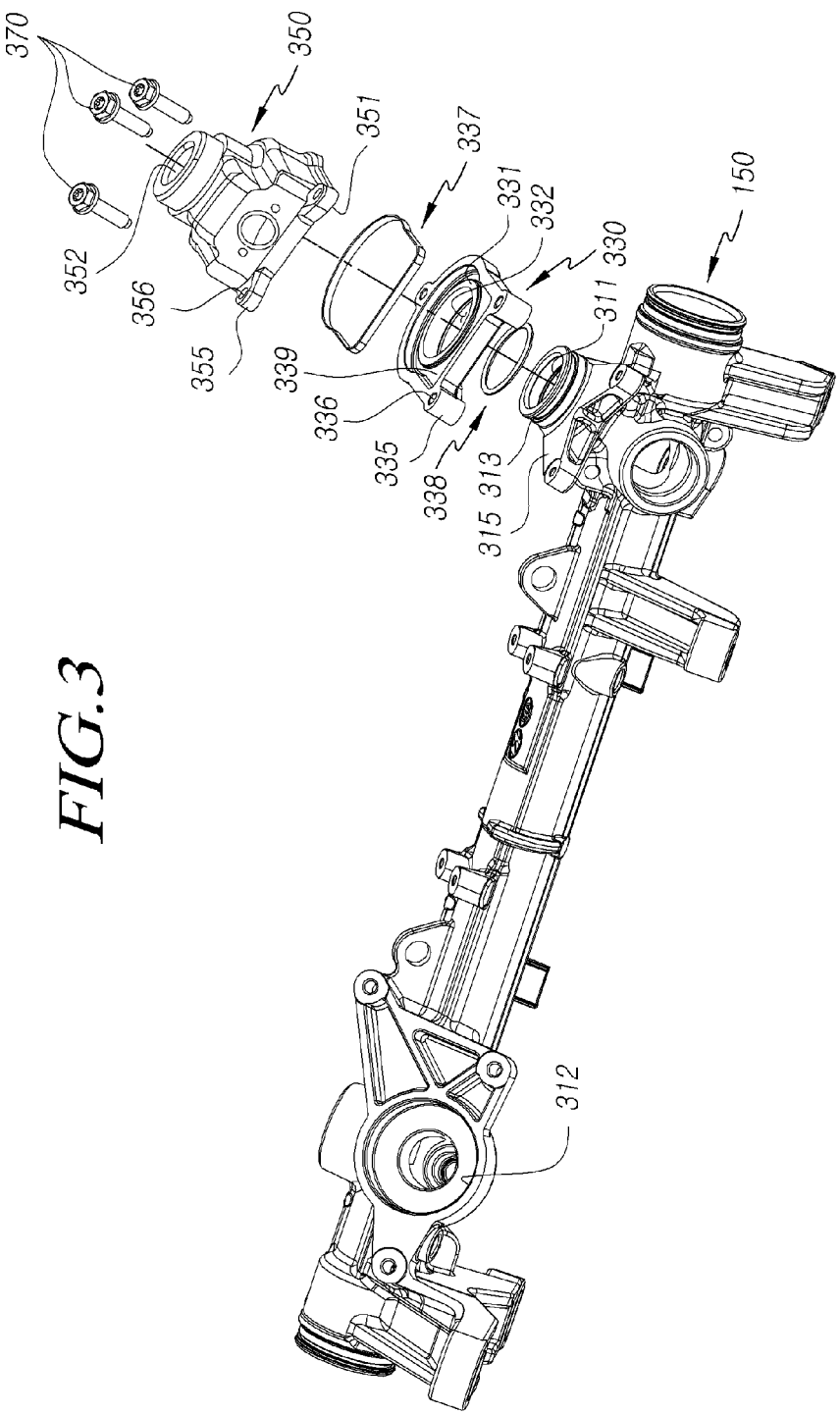
FIG. 3 is an exploded perspective view of a power steering apparatus of a vehicle according to the present invention.
Figure 4:
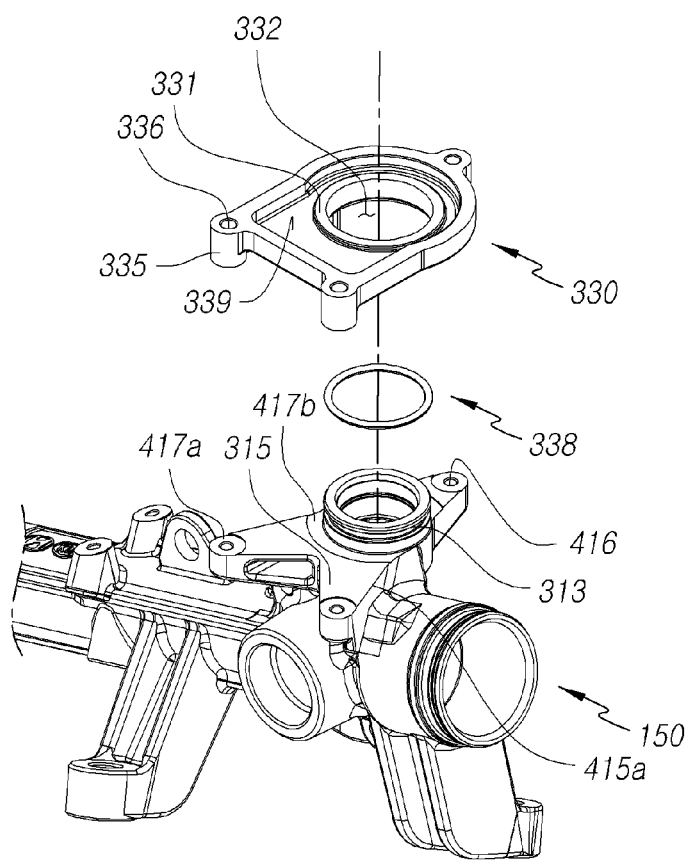
FIG. 4 is an exploded perspective view of a part of the power steering apparatus of FIG. 3.
Figure 5:
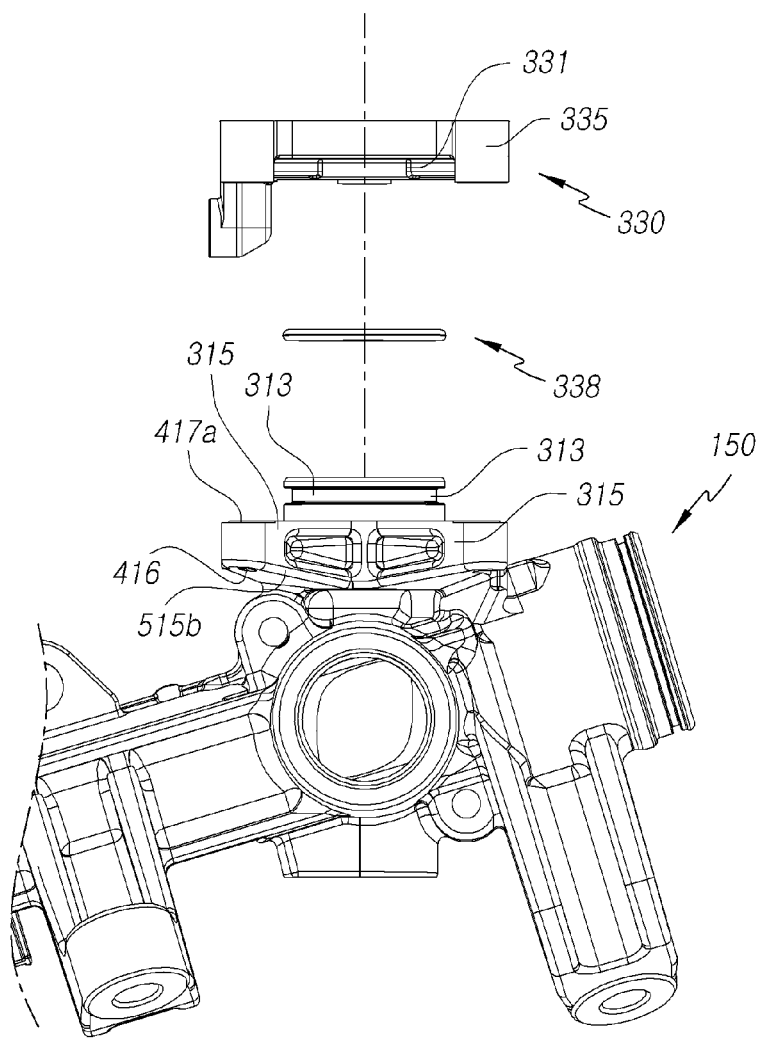
FIG. 5 is a side view of FIG. 4.

FIG. 3 is an exploded perspective view of a power steering apparatus of a vehicle according to the present invention. FIG. 4 is an exploded perspective view of a part of the power steering apparatus of FIG. 3. FIG. 5 is a side view of FIG. 4.

As illustrated in FIG. 1 and these drawings, the power steering apparatus 100 of the vehicle, according to the present invention, includes: a rack housing 150 that surrounds a rack bar 140 and has an opening portion 311 formed at one side thereof through which a steering shaft 104 passes, wherein fastening portions 315 protrude from the outer circumferential surface of the opening portion 311 and have fastening holes 416 formed therein to which fastening members 370 are screw-coupled; a torque sensor cover 350 that has a torque sensor 207 therein and has a communicating hole 352 formed therein through which the steering shaft 104 passes and first penetration portions 355 having first through-holes 356 formed therein through which the fastening members 370 pass, wherein the first penetration portions 355 are provided to correspond to the fastening holes 416 and the fastening portions 315; and a cover connecting member 330 that has an insertion portion 331 and second penetration portions 335 in order to connect the rack housing 150 and the torque sensor cover 350, the insertion portion 331 having an insertion hole 332 formed therein where the opening portion 311 is inserted and coupled and the second penetration portions 335 having second through-holes 336 that are formed therein to correspond to the fastening holes 416 and through which the fastening members 370 pass, wherein the cover connecting member 330 has the outer periphery formed in a shape corresponding to the outer periphery of the torque sensor cover 350 and protrudes toward the torque sensor cover 350 such that the torque sensor cover 350 is coupled thereto.

The power steering apparatus 100 of the vehicle is used to steer the wheels 180 when a driver turns a steering wheel 102. When the driver turns the steering wheel 102, the steering shaft 104 rotates, and a pinion gear 110 formed on the distal end of the steering shaft 104 rotates accordingly. The pinion gear 110 is engaged with a rack gear 108 formed on the rack bar 140 so that the rotational motion of the pinion gear 110 is converted into a linear motion of the rack bar 140 in the left and right direction, and the linear motion is transmitted to the wheels 180 through tie rods 160 and knuckles 190.

In addition, by way of example, when the steering shaft 104 rotates, the torque sensor 207 may detect a torque, convert the detected torque into an electrical signal, and transfer the electrical signal to an ECU (not illustrated). The ECU (not illustrated) may forward the electrical signal to a motor (not illustrated), and the motor (not illustrated) may provide a steering assist force to the rack bar 140, on which a second rack gear (not illustrated) is formed, by rotating a pinion shaft (not illustrated) on which a second pinion gear (not illustrated) is formed.

The rack housing 150, which surrounds the rack bar 140, may have the opening portion 311 formed on one side thereof and a pinion opening portion 312 formed on an opposite side thereof such that the steering shaft 104 and the pinion shaft (not illustrated) may be engaged with the rack bar 140. The steering shaft 104 is engaged with the rack bar 140 while being inserted into the opening portion 311, and the pinion shaft (not illustrated) is engaged with the rack bar 140 while being inserted into the pinion opening portion 312.

The torque sensor cover 350, which surrounds the torque sensor 207 that detects the torque of the steering shaft 104 and sends a signal to the ECU (not illustrated), is coupled to the opening portion 311 of the rack housing 150 by the cover connecting member 330. A detailed description thereof will be given below.

First, in the related art, an opening portion of a rack housing has a large opening in order to accommodate a torque sensor therein. Accordingly, the opening portion is molded using a slide core. However, in the present invention, the opening portion 311 has a small opening and is molded using a pin slide accordingly. As a result, a weak portion of a main core for molding the rack housing 150 is reinforced.

In addition, the fastening portions 315 protrude from positions spaced apart from the upper end of the outer circumferential surface of the opening portion 311, and the fastening holes 416 to which the fastening members 370 are screw-coupled are formed in the fastening portions 315 such that the fastening members 370 may be screw-coupled to the rack housing 150.

In this case, the fastening portions 315 and the fastening holes 416 of the opening portion 311 may be molded using the main core and pin slides.

The torque sensor cover 350 has a cover opening portion 351 formed thereon, which is open at the bottom thereof, and is coupled to the rack housing 150 by the cover connecting member 330. The torque sensor cover 350 has the communicating hole 352 formed in the upper portion thereof such that the steering shaft 104 may protrude outward from the torque sensor cover 350 through the communicating hole 352.

Further, the torque sensor cover 350 includes the first penetration portions 355 having the first through-holes 356 that are formed therein to correspond to the fastening holes 416, and the fastening members 370 are screw-coupled to the fastening holes 416 while passing through the first through-holes 356 and the second through-holes 336 to be described below.

The cover connecting member 330 includes the second penetration portions 335 having the second through-holes 336, which are formed therein to correspond to the fastening holes 416, so as to be coupled between the rack housing 150 and the torque sensor cover 350. The cover connecting member 330 is coupled between the opening portion 311 of the rack housing 150 and the torque sensor cover 350.

In this case, the second through-holes 336 are formed to be larger than the first through-holes 356 and the fastening holes 416 so that the fastening members 370 may easily pass through the second through-holes 336. Accordingly, the cover connecting member 330 and the torque sensor cover 350 may be easily assembled to the rack housing 150.

Further, the cover connecting member 330 has a watertight surface 339 in order to prevent foreign substances or moisture from infiltrating into the rack housing 150, and the exterior of the cover connecting member 330 is formed in a shape that corresponds to the exterior of the torque sensor cover 350.

Moreover, the insertion portion 331 having the insertion hole 332 formed therein, to which the opening portion 311 of the rack housing 150 is coupled, is provided on a side of the watertight surface 339, and the second penetration portions 335 having the second through-holes 336 formed therein, through which the fastening members 370 pass, are provided on the outer periphery of the watertight surface 339.

As the watertight surface 339 is provided on the cover connecting member 330 as described above, the cover connecting member 330 seals the space between the cover opening portion 351 of the torque sensor cover 350, which has a large opening to accommodate the torque sensor therein, and the opening portion 311 of the rack housing 150, which has a small opening such that the steering shaft 104 is inserted into the opening portion 311, in order to prevent foreign substances (such as dust, moisture, etc.) from infiltrating into the rack housing 150.

As the cover connecting member 330 has the outer periphery formed in a shape corresponding to the outer periphery of the torque sensor cover 350 and protrudes upward, the protruding upper end portion of the cover connecting member 330 and the lower end portion of the cover opening portion 351 are assembled while making contact with each other. A cover sealing member 337 is provided between the upper end portion of the cover connecting member 330 and the lower end portion of the cover opening portion 351.

Namely, in order to prevent foreign substances from infiltrating between the cover connecting member 330 and the torque sensor cover 350, the upper end portion protrudes from the cover connecting member 330 along the outer periphery thereof, and the cover sealing member 337 is provided between the upper end portion of the cover connecting member 330 and the lower end portion of the torque sensor cover 350 while being compressed.

In this case, the cover sealing member 337 may be compressed while the fastening members 370 are being screw-coupled to the fastening holes 416.

Further, the insertion hole 332 is formed in the center of the cover connecting member 330, and the opening portion 311 is inserted into, and coupled to, the insertion hole 332. The opening portion 311 is assembled to the insertion hole 332 while the outer circumferential surface of the opening portion 311 makes contact with the inner circumferential surface of the insertion hole 332, and a housing sealing member 338 is provided between the inner circumferential surface of the insertion hole 332 and the outer circumferential surface of the opening portion 311.

In order to receive the housing sealing member 338, a groove 313 may be concavely formed on the inner circumferential surface of the insertion hole 332, or on the outer circumferential surface of the opening portion 311, in the circumferential direction, and the housing sealing member 338 may be inserted into, and assembled to, the groove 313.

Further, the insertion portion 331 of the cover connecting member 330 may protrude upward and downward from the watertight surface 339 so that the housing sealing member 338 may be stably positioned between the inner circumferential surface of the insertion portion 331 and the outer circumferential surface of the opening portion 311 without separation.

The cover sealing member 337 and the housing sealing member 338 may prevent foreign substances, dust, or the like from infiltrating into the rack housing 150 from the outside, and may absorb vibration, noise, and the like between the rack housing 150 and the cover connecting member 330.

Consequently, thanks to the cover connecting member 330, the opening portion 311 of the rack housing 150 may be molded using a pin slide, and a weak portion of the main core for manufacturing the rack housing 150 may be reinforced, thereby preventing the fracture of the main core.

In other words, in the related art, as a slide core is added to a main core, which is a whole frame for molding a rack housing, a part of the main core becomes thinner so that the main core is weakened. However, in the present invention, the opening portion of the rack housing may be molded using a pin slide rather than a slide core so that it possible to prevent a weak portion from being generated in the main core.

In addition, the number of slide cores used in the manufacturing of the rack housing decreases so that it is possible to reduce the manufacturing process and time.

In particular, in the case of the power steering apparatus 100 of the vehicle in which the steering shaft 104 and the pinion shaft (not illustrated) are engaged with the rack bar 140, even though the direction in which the steering shaft 104 is engaged with the rack bar 140 differs from that in which the pinion shaft (not illustrated) is engaged with the rack bar 140, it is possible to reduce the crack of the main core, and due to the change of slide cores to relatively simple slide cores, it is possible to facilitate the maintenance of the slide cores and to make casting equipment for the rack housing 150 compact.

Further, the fastening members 370 are screw-coupled to the fastening holes 416, which are formed in the fastening portions 315 of the rack housing 150, while passing through the first through-holes 356 of the torque sensor cover 350 and the second through-holes 336 of the cover connecting member 330. Accordingly, the cover connecting member 330 and the torque sensor cover 350 may be assembled to the rack housing 150.

Two or more fastening portions 315 may be formed to protrude from the outer circumferential surface of the opening portion 311. The torque sensor cover 350 may have two or more first penetration portions 355 and first through-holes 356 that are formed therein to correspond to the fastening holes 416 formed in the respective fastening portions 315, and the cover connecting member 330 may have two or more second penetration portions 335 and second through-holes 336 that are formed therein to correspond to the fastening holes 416 formed in the respective fastening portions 315.

Further, in order to fixedly align the cover connecting member 330 with the opening portion 311 when assembling the cover connecting member 330 to the opening portion 311, the second penetration portions 335 and the insertion portion 331 protrude toward the rack housing 150, first stepped mounting portions 417a are formed around the fastening holes 416 on the distal end portions of the fastening portions 315, and second stepped mounting portions 417b are formed on the end portions of the fastening portions 315, which are directed toward the opening portion 311, around the opening portion 311, which makes it possible to enhance the assembly efficiency.

Namely, the second penetration portions 335 may be assembled to, and positioned on, the first mounting portions 417a, and the insertion portion 331 may be assembled to, and positioned on, the second mounting portions 417b so that it is possible to identify whether the cover connecting member 330 is correctly assembled to the rack housing 150, thereby facilitating the assembly of the cover connecting member 330 to the rack housing 150 and enhancing the assembly efficiency.

The fastening portions 315 may have first reinforcing portions 415a having a gradually increasing width and second reinforcing portions 515a having a gradually increasing thickness from the distal ends of the fastening portions 315 toward the opening portion 311. The first reinforcing portions 415a and the second reinforcing portions 515a may supplement the rigidity between the opening portion 311 and the fastening portions 315 in the manufacturing of the rack housing 150, which makes it possible to easily manufacture the rack housing 150.

Further, the interior of each fastening portion 315 between the fastening hole 416 and the opening portion 311 is concavely formed so that it is possible to reduce the material cost in the manufacturing of the rack housing 150 and to decrease the weight of the rack housing 150.

As described above, according to the present invention, the complex structure is separately manufactured and coupled in the manufacturing of the rack housing, which simplifies the shape of the rack housing, so that it is possible to prevent a weak portion from being generated in a main core for manufacturing the rack housing and to reduce the number of slide cores used in the manufacturing of the rack housing, thereby reducing the manufacturing process and time.

In addition, it is possible to reduce the crack of the main core for manufacturing the rack housing, to facilitate the maintenance of the slide cores due to the change of some shape slides to relatively simple pin slides, and to make rack housing casting equipment compact.

Although all the elements that constitute the embodiment of the present invention have been illustrated as being coupled into one or operating in the coupled state, the present invention is not necessarily limited thereto. That is, at least two elements of all structural elements may be selectively joined and operate without departing from the scope of the present invention.

Although a preferred embodiment of the present invention has been described for illustrative purposes, those skilled in the art will appreciate that various modifications, additions and substitutions are possible, without departing from the scope and spirit of the invention as disclosed in the accompanying claims. Therefore, the embodiments disclosed in the present invention are intended to illustrate the scope of the technical idea of the present invention, and the scope of the present invention is not limited by the embodiment. The scope of the present invention shall be construed on the basis of the accompanying claims in such a manner that all of the technical ideas included within the scope equivalent to the claims belong to the present invention.

DESCRIPTION OF REFERENCE NUMERALS

104: Steering shaft
150: Rack housing
311: Opening portion
312: Pinion opening portion
313: Groove
315: Fastening portion
330: Cover connecting member
337: Cover sealing member
338: Housing sealing member
350: Torque sensor cover
351: Cover opening portion
352: Communicating hole
355: First penetration portion
356: First through-hole
370: Fastening member
415a: First reinforcing portion
416: Fastening hole
417a: First mounting portion
417b: Second mounting portion
331: Insertion portion
332: Insertion hole
335: Second penetration portion
336: Second through-hole
515b: Second reinforcing portion

What is claimed is:
1. A power steering apparatus of a vehicle, comprising:
a rack housing configured to surround a rack bar and having an opening portion formed at one side thereof through which a steering shaft passes, wherein a fastening portion protrudes from the outer circumferential surface of the opening portion and has a fastening hole formed therein to which a fastening member is screw-coupled;
a torque sensor cover that has a torque sensor therein and has a communicating hole formed therein through which the steering shaft passes and a first penetration portion having a first through-hole formed therein through which the fastening member passes, wherein the first penetration portion is provided to correspond to the fastening hole; and a cover connecting member that has an insertion portion and a second penetration portion in order to connect the rack housing and the torque sensor cover, the insertion portion having an insertion hole formed therein where the opening portion is inserted and coupled and the second penetration portion having a second through-hole that is formed therein to correspond to the fastening hole and through which the fastening member passes, wherein the cover connecting member has the outer periphery formed in a shape corresponding to the outer periphery of the torque sensor cover and protrudes toward the torque sensor cover such that the torque sensor cover is coupled thereto.

2. The power steering apparatus of the vehicle of claim 1, wherein two or more fastening portions protrude from the outer circumferential surface of the opening portion, each of which has the fastening hole formed therein, and two or more first penetration portions, second penetration portions, first through-holes, and second through-holes are formed to correspond to the fastening portions and the fastening holes.

3. The power steering apparatus of the vehicle of claim 1, wherein the rack housing has a pinion opening portion formed on an opposite side thereof through which a pinion shaft passes.

4. The power steering apparatus of the vehicle of claim 1, wherein a housing sealing member is coupled between the outer circumferential surface of the opening portion and the inner circumferential surface of the insertion portion while being compressed.

5. The power steering apparatus of the vehicle of claim 4, wherein a groove is concavely formed on the outer circumferential surface of the opening portion, or on the inner circumferential surface of the insertion portion, in the circumferential direction such that the housing sealing member is coupled to the groove.

6. The power steering apparatus of the vehicle of claim 1, wherein the second penetration portion and the insertion portion protrude toward the rack housing, a first stepped mounting portion is formed around the fastening hole on the distal end portion of the fastening portion, and a second stepped mounting portion is formed on the end portion of the fastening portion, which is directed toward the opening portion, around the opening portion.

7. The power steering apparatus of the vehicle of claim 1, wherein the fastening portion has a first reinforcing portion having a gradually increasing width and a second reinforcing portion having a gradually increasing thickness from the distal end of the fastening portion toward the opening portion.

8. The power steering apparatus of the vehicle of claim 1, wherein the second through-hole is formed larger than the fastening hole such that the fastening member easily passes through the second through-hole.

* * * * *